(12) United States Patent
Habibvand (10) Patent No.: US 9,890,814 B2
(45) Date of Patent: *Feb. 13, 2018

(54) CAGE FOR HOURGLASS ROLLER BEARINGS

(71) Applicant: Roller Bearing Company of America, Inc., Oxford, CT (US)

(72) Inventor: Alex Habibvand, Orange, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/728,426

(22) Filed: Jun. 2, 2015

(65) Prior Publication Data

US 2015/0354631 A1 Dec. 10, 2015

Related U.S. Application Data

(60) Provisional application No. 62/007,212, filed on Jun. 3, 2014.

(51) Int. Cl.
| | |
|---|---|
| *F16C 19/38* | (2006.01) |
| *B64C 9/16* | (2006.01) |
| *F16C 33/46* | (2006.01) |
| *F16C 33/48* | (2006.01) |
| *B64C 9/00* | (2006.01) |

(Continued)

(52) U.S. Cl.
CPC ............ *F16C 33/4676* (2013.01); *B64C 9/00* (2013.01); *B64C 9/16* (2013.01); *F16C 19/381* (2013.01); *F16C 23/086* (2013.01); *F16C 33/4682* (2013.01); *F16C 33/48* (2013.01); *F16C 33/497* (2013.01); *F16C 11/0614* (2013.01);

(Continued)

(58) Field of Classification Search
CPC ........ B64C 9/16; F16C 23/086; F16C 33/497; F16C 2240/44; F16C 19/38
USPC .......................................................... 244/214
See application file for complete search history.

(56) References Cited

U.S. PATENT DOCUMENTS

| | | |
|---|---|---|
| 1,199,404 A | 9/1916 | Miller |
| 1,376,310 A | 4/1921 | Armstrong |

(Continued)

FOREIGN PATENT DOCUMENTS

| | | |
|---|---|---|
| CN | 100436851 C | 11/2008 |
| DE | 2800854 A1 | 7/1978 |

(Continued)

OTHER PUBLICATIONS

Extended European Search Report for EP Patent Application No. 15170498.8-1760/2957781, dated Feb. 5, 2016.

(Continued)

*Primary Examiner* — Brian M O'Hara
*Assistant Examiner* — Keith L Dixon
(74) *Attorney, Agent, or Firm* — Murtha Cullina, LLP (57) ABSTRACT

A cage for an hourglass roller bearing includes an annular ring having a first axial face and a second axial face. A plurality of first rails extend from the first axial face and a plurality of second rails extend from the second axial face. The cage includes a plurality of pockets. Each of the plurality of pockets is defined by opposing circumferentially facing walls of at least one of adjacent pairs of the first rails and adjacent pairs of the second rails. The circumferentially facing walls are arcuately formed so that each of the plurality of pockets is cylindrical.

9 Claims, 7 Drawing Sheets

(51) Int. Cl.
*F16C 23/08* (2006.01)
*F16C 33/49* (2006.01)
*F16C 11/06* (2006.01)

(52) U.S. Cl.
CPC ......... *F16C 19/38* (2013.01); *F16C 2240/44* (2013.01); *F16C 2326/43* (2013.01)

(56) References Cited

U.S. PATENT DOCUMENTS

| | | | |
|---|---|---|---|
| 1,901,967 A | 3/1933 | Hoover | |
| 2,387,962 A | 10/1945 | Williams | |
| 2,678,246 A | 5/1954 | Potter | |
| 2,764,432 A | 9/1956 | Leister et al. | |
| 2,767,037 A | 10/1956 | Williams | |
| 3,594,851 A | 7/1971 | Swatton | |
| 4,049,219 A | 9/1977 | Dean et al. | |
| 4,557,613 A | 12/1985 | Tallain et al. | |
| 4,714,358 A | 12/1987 | Bayer et al. | |
| 4,929,098 A | 5/1990 | Takata et al. | |
| 5,310,269 A | 5/1994 | Wardle et al. | |
| 5,441,351 A * | 8/1995 | Grunze | F16C 23/086 384/450 |
| 5,586,826 A | 12/1996 | Kellstrom et al. | |
| 5,667,312 A | 9/1997 | Grunze et al. | |
| 6,315,458 B1 * | 11/2001 | Unno | F16C 19/26 384/565 |
| 6,390,685 B1 | 5/2002 | Shimomura et al. | |
| 6,394,656 B1 | 5/2002 | Williams | |
| 7,959,678 B2 | 6/2011 | Filippi et al. | |
| 8,025,257 B2 | 9/2011 | Gyuricsko et al. | |
| 8,070,106 B2 | 12/2011 | Engelbrecht et al. | |
| 8,511,619 B2 * | 8/2013 | Mann | B64C 9/22 244/214 |
| 8,534,612 B2 | 9/2013 | Morris | |
| 8,567,727 B2 | 10/2013 | Morris | |
| 8,714,493 B2 | 5/2014 | Morris | |
| 8,753,457 B2 | 6/2014 | Moyer | |
| 9,227,720 B2 * | 1/2016 | Habibvand | B64C 9/02 |
| 2005/0069239 A1 | 3/2005 | Yamamoto et al. | |
| 2006/0115193 A1 | 6/2006 | Begin | |
| 2008/0040886 A1 | 2/2008 | Arnold et al. | |
| 2008/0219834 A1 | 9/2008 | Merfeld et al. | |
| 2009/0169145 A1 | 7/2009 | Obayashi et al. | |
| 2010/0027933 A1 | 2/2010 | Locke et al. | |
| 2010/0033965 A1 | 2/2010 | Casey et al. | |
| 2010/0150486 A1 | 6/2010 | Kuppuraju et al. | |
| 2010/0215303 A1 | 8/2010 | Shaikh | |
| 2011/0064348 A1 | 3/2011 | Jacob et al. | |
| 2011/0086754 A1 | 4/2011 | Gentleman et al. | |
| 2011/0127386 A1 | 6/2011 | Morris | |
| 2011/0182539 A1 | 7/2011 | Kolar | |
| 2011/0220762 A1 | 9/2011 | Gyuricsko et al. | |
| 2011/0274382 A1 | 11/2011 | Berns et al. | |
| 2011/0293212 A1 | 12/2011 | Kobayashi | |
| 2011/0317952 A1 | 12/2011 | Heaton et al. | |
| 2012/0082409 A1 | 4/2012 | Miyachi | |
| 2012/0263405 A1 | 10/2012 | Mizuki et al. | |
| 2012/0291625 A1 | 11/2012 | Habibvand | |
| 2013/0087662 A1 | 4/2013 | Soenarjo | |
| 2013/0108200 A1 | 5/2013 | Berns | |
| 2013/0112814 A1 | 5/2013 | Yue | |
| 2013/0142471 A1 | 6/2013 | Muller et al. | |
| 2014/0193112 A1 | 7/2014 | Caspall | |
| 2014/0301680 A1 | 10/2014 | Tecza et al. | |
| 2014/0301689 A1 | 10/2014 | Honjo | |
| 2014/0334761 A1 | 11/2014 | Hewitt et al. | |
| 2014/0339369 A1 | 11/2014 | Habibvand | |
| 2014/0345141 A1 | 11/2014 | Gonzalez et al. | |
| 2014/0369634 A1 | 11/2014 | Gonzalez et al. | |
| 2015/0078699 A1 | 3/2015 | Gessendorfer et al. | |

FOREIGN PATENT DOCUMENTS

| | | |
|---|---|---|
| DE | 19612571 A1 | 10/1997 |
| DE | 102006050940 A1 | 4/2008 |
| DE | 102009042941 A1 | 3/2011 |
| EP | 0189365 A1 | 7/1986 |
| EP | 0649990 A1 | 4/1995 |
| EP | 1315914 B1 | 10/2005 |
| EP | 2354579 A2 | 8/2011 |
| EP | 2067696 B1 | 8/2013 |
| EP | 2589829 A1 | 8/2013 |
| GB | 2237336 A | 5/1991 |
| GB | 2428996 A | 2/2007 |
| JP | 2006071091 A | 3/2006 |
| JP | 2006266277 A | 5/2006 |
| JP | 2008286330 A | 11/2008 |
| JP | 2012017770 A | 1/2012 |
| JP | 2012202453 A | 10/2012 |
| JP | 2013145012 A | 7/2013 |
| JP | 2014018825 A | 2/2014 |
| WO | 2001025647 A1 | 4/2001 |
| WO | 2007074691 A1 | 7/2007 |
| WO | 2007125001 A2 | 11/2007 |
| WO | 2011140230 A1 | 11/2011 |
| WO | 2012129223 A1 | 9/2012 |
| WO | 2013122526 A1 | 8/2013 |
| WO | 20131329645 A1 | 9/2013 |
| WO | 2014021958 A1 | 2/2014 |
| WO | 2014182569 A2 | 11/2014 |
| WO | 2015031247 A2 | 3/2015 |

OTHER PUBLICATIONS

Extended European Search Report for European Patent Application No. 15170493.9-1760 / 2952760, dated Jan. 4, 2016.
Extended Search Report for EP15170500.1-1751, dated Nov. 5, 2015.
Office Communication issued in corresponding European Application No. 14198599.4, dated May 11, 2016, pp. 1-5.
Extended European Search Report for European Patent Application No. 14198599.4-1751 / 2894359, dated Jun. 17, 2015.

* cited by examiner

FIG. 10 ically facing walls are arcuately formed so that each pocket of the plurality of pockets is cylindrical. One of the plurality of rollers is rollingly engaged in each of the plurality of pockets.

CAGE FOR HOURGLASS ROLLER BEARINGS

CROSS REFERENCE TO RELATED APPLICATION

This application claims the benefit of U.S. Provisional Patent Application Ser. No. 62/007,212, filed on Jun. 3, 2014, which is incorporated herein by reference in its entirety.

FIELD OF THE INVENTION

This invention relates to a cage for hourglass roller bearings and more specifically to a cage having cylindrical cage pockets.

BACKGROUND

Known roller bearings include various means for guiding and positioning rollers. Such roller bearings typically include an inner ring that provides a substantially spherical inner race surface, a pair of outer race surfaces having convex curvatures, and a pair of oppositely inclined rows of symmetrical hourglass-shaped rollers. This type of bearing may be referred to as an hourglass roller bearing.

Hourglass roller bearings may be used in oscillatory applications, such as in aircraft flight control surfaces. In such applications, for example, rotation of the outer ring relative to the inner ring may be limited within a window or rotation for example 45 degrees. In such applications it may be desired that the rollers precess or index, so that they are each cycled through the load zone. Cycling the rollers results in use of the entire race surface of each of the rollers to extend rolling contact fatigue life. Cycling the rollers also redistributes grease for improved lubrication of the bearing unit which in turn reduces fretting damage and improves the bearing unit's resistance to raceway corrosion. Typical cages can inhibit the precessing or indexing of the rollers.

SUMMARY OF THE INVENTION

In one aspect, the present invention resides in a cage for an hourglass roller bearing. The cage includes an annular ring having a first axial face and a second axial face. A plurality of first rails extend from the first axial face and a plurality of second rails extend from the second axial face. The cage includes a plurality of pockets. Each of the plurality of pockets is defined by opposing circumferentially facing walls of at least one of adjacent pairs of the first rails and adjacent pairs of the second rails. The circumferentially facing walls are arcuately formed so that each pocket of the plurality of pockets is cylindrical.

In another aspect disclosed herein, there is provided an hourglass bearing assembly that includes an inner raceway defining a radially outwardly facing convex surface having an inner raceway radius of curvature. The hourglass bearing assembly includes an outer raceway defining a radially inward facing convex inner surface having an outer raceway radius of curvature Ro. The outer raceway is positioned around the inner raceway. The hourglass bearing assembly includes a plurality of rollers disposed between the inner raceway and the outer raceway. Each roller of the plurality of rollers has an hourglass shape and is in rolling engagement with the inner raceway and the outer raceway. The hourglass bearing includes a cage disposed between the inner raceway and the outer raceway. The cage includes an annular ring having a first axial face and a second axial face, a plurality of first rails extends from the first axial face and a plurality of second rails extends from the second axial face. The cage includes a plurality of pockets. Each pocket of the plurality of pockets is defined by opposing circumferentially facing walls of at least one of adjacent pairs of the first rails and adjacent pairs of the second rails, respectively. The circumferentially facing walls are arcuately formed so that each pocket of the plurality of pockets is cylindrical. One of the plurality of rollers is rollingly engaged in each of the plurality of pockets.

In another aspect disclosed herein, there is provided an edge flap arrangement for an aircraft wing. The edge flap arrangement includes a main flap element and an actuator for moving the main flap element relative to the wing. The edge flap arrangement includes a linkage arrangement supporting the main flap element from the aircraft wing for movement relative to the wing. The linkage arrangement includes a drop link. The drop link includes a fixed strut secured to the aircraft wing. The drop link is secured to the main flap. The fixed strut and the drop link are pivotally connected by a hinge point. The hinge point includes a first bearing. The first bearing includes an outer race having at least one convex inner surface and an interior area and an inner race having a convex outer surface. A portion of the inner race is disposed in the interior area. The bearing includes a plurality of rollers disposed between the inner race and the outer race. Each roller of the plurality of rollers has an hourglass shape and is in rolling engagement with the inner race and the outer race. The bearing includes a cage disposed between the inner raceway and the outer raceway. The cage includes an annular ring having a first axial face and a second axial face. A plurality of first rails extends from the first axial face and a plurality of second rails extends from the second axial face. The cage includes a plurality of pockets. Each pocket of the plurality of pockets is defined by opposing circumferentially facing walls of at least one of adjacent pairs of the first rails and adjacent pairs of the second rails. The circumferentially facing walls are arcuately formed so that each pocket of the plurality of pockets is cylindrical. One roller of the plurality of rollers is rollingly engaged in each pocket of the plurality of pockets.

DETAILED DESCRIPTION OF THE INVENTION

Figure 1:
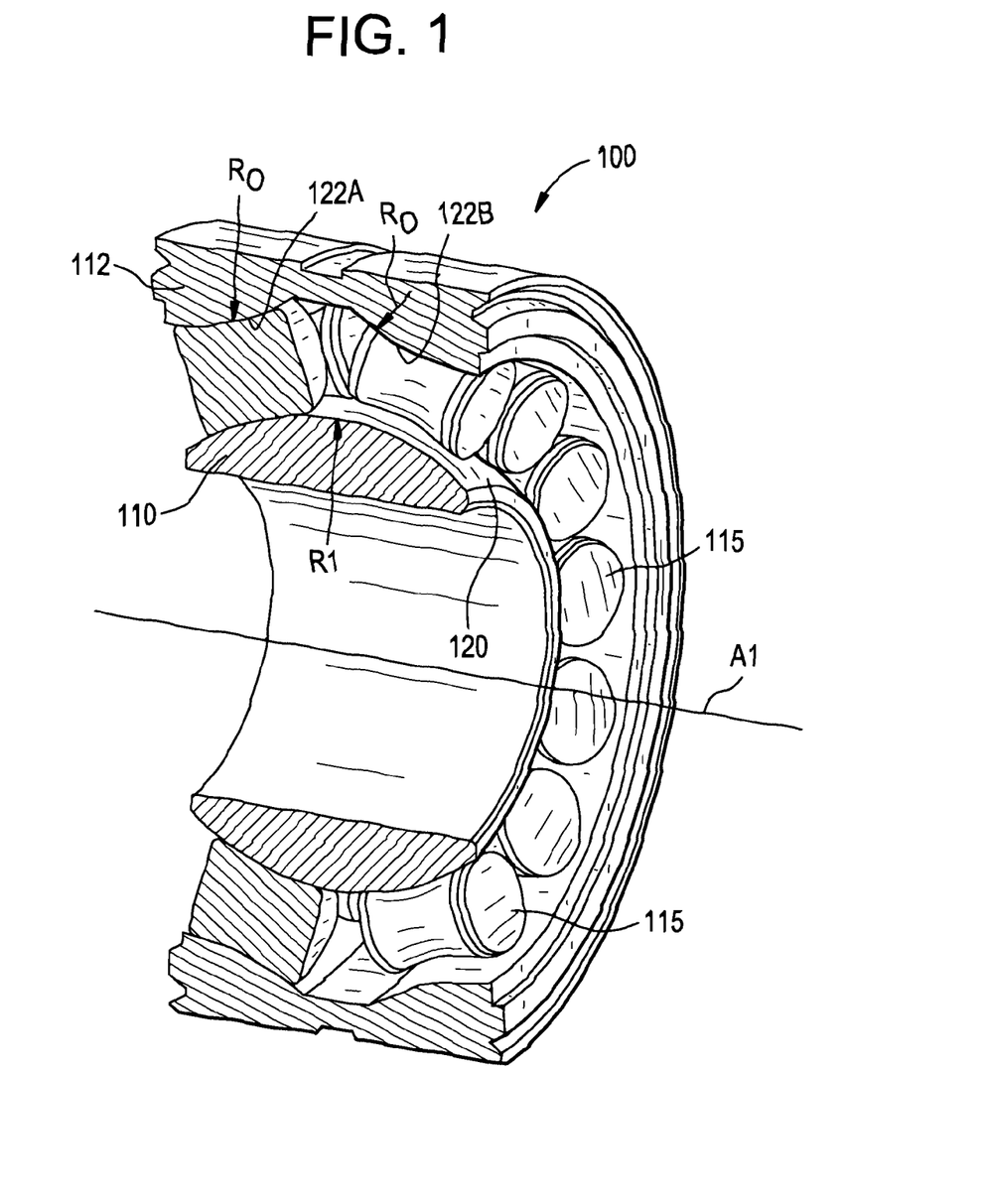
FIG. 1 is a perspective view of a cross section of an hourglass bearing having the cage of the present invention.
Figure 10:
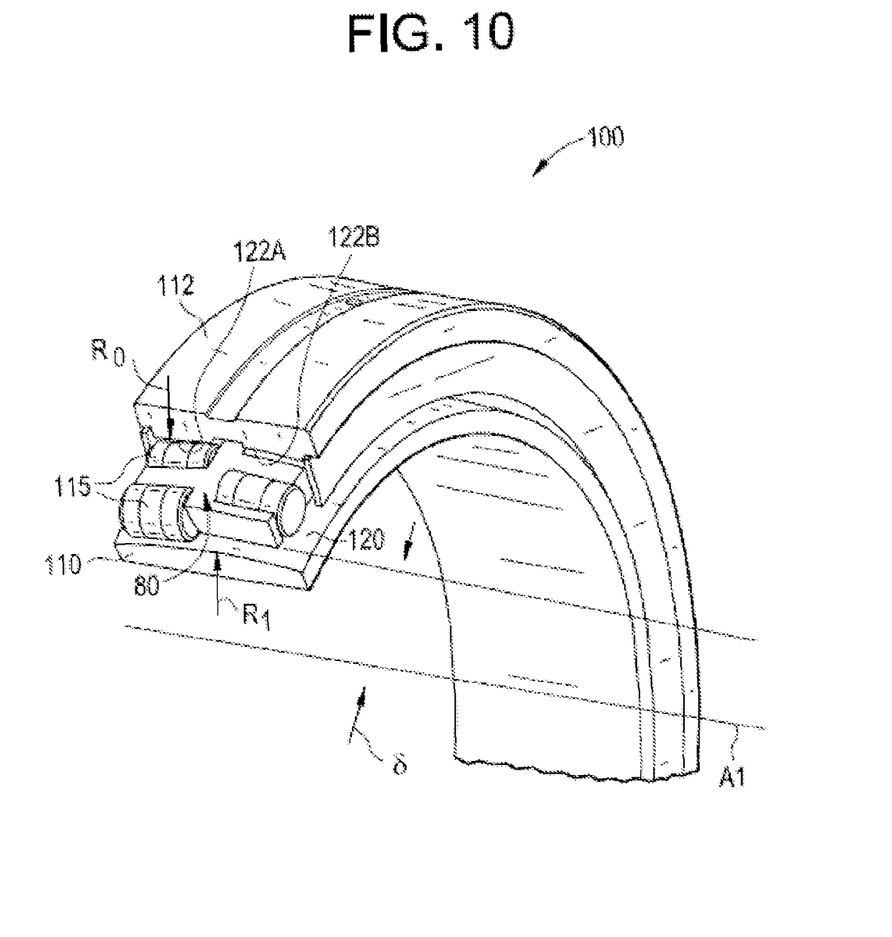
FIG. 10 is a perspective view of the hourglass bearing having the cage of the present invention of FIG. 1, wherein the cage is shown.

As shown in FIGS. 1 and 10, an hourglass bearing assembly is generally designated by the numeral 100. The hourglass bearing assembly 100 includes an inner race 110 defining a radially outwardly facing convex surface 120 having a radius of curvature R1. The hourglass bearing assembly 100 includes an outer race 112 defining two radially inward facing convex inner surfaces 122A and 122B, each having radius of curvature Ro. The outer race 112 is positioned around the inner race 110. A plurality of rollers 115 is disposed between the inner race 110 and the outer race 112 in two rows. Each roller of the plurality of rollers 115 has an hourglass shape. Each roller of the plurality of rollers 115 in one row is in rolling engagement with the radially outwardly facing convex surface 120 of the inner race 110 and the radially inward facing convex inner surface 122A of the outer race 112. Each roller of the plurality of rollers 115 in a second row is in rolling engagement with the radially outwardly facing convex surface 120 of the inner race 110 and the radially inward facing convex inner surface 122B of the outer race 112.

Figure 2:
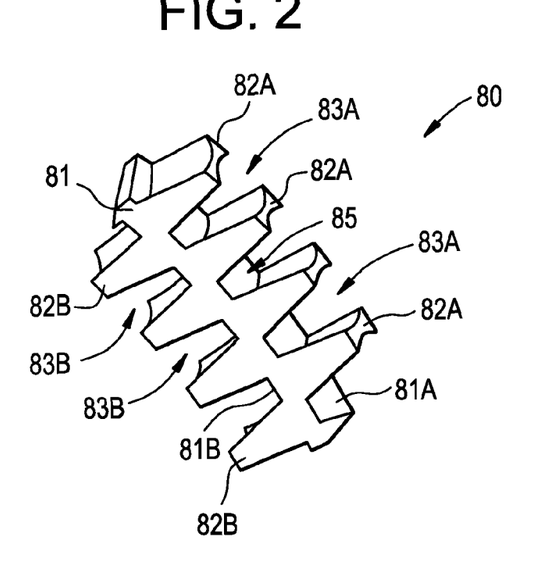
FIG. 2 is a perspective view of a portion of a cage for the hourglass bearing of FIG. 1.
Figure 3:
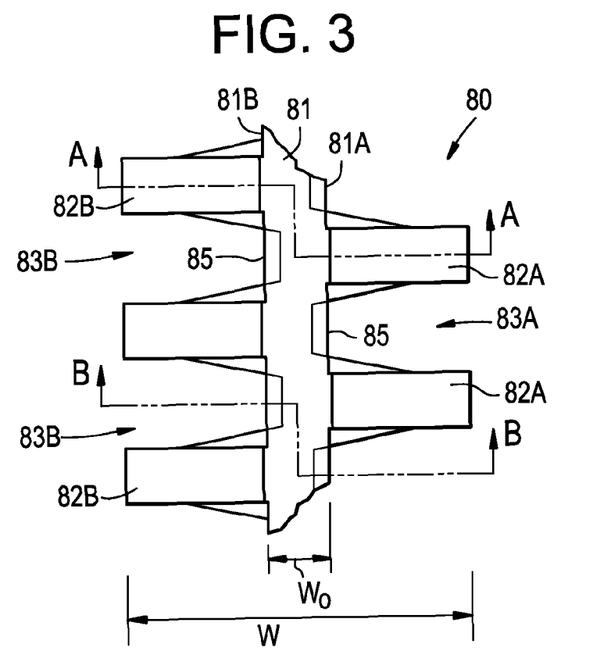
FIG. 3 is a side view of a portion of the cage of FIG. 2, taken from a central axis of the cage.
Figure 4:
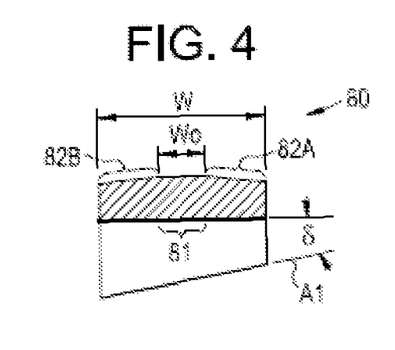
FIG. 4 is a cross sectional view of a portion of the cage of FIG. 3 taken across section A-A.

Referring to FIGS. 2 and 3 a cage 80 for the bearing 100 of FIG. 1 includes an annular ring 81 having a first axially facing surface 81A and a second axially facing surface 81B. The annular ring 81 has a thickness Wo. The first axially facing surface 81A has a plurality of first rails 82A extending therefrom. The second axially facing surface 81B has a plurality of second rails 82B extending therefrom. Adjacent ones of the plurality of first rails 82A define a first pocket 83A therebetween. The first pockets 83A are equally spaced from one another. Adjacent ones of the plurality of second rails 82B define a second pocket 83B therebetween. The second pockets 83B are equally spaced from one another and are symmetrically and circumferentially offset from respective ones of the first pockets 83A. The cage 80 has a width W that extends between respective axial ends of the rails 82A and 82B, as shown in FIG. 3. In one embodiment, the plurality of first rails 82A and the plurality of second rails 82B are opposite one another so that each of the first pockets 83A and each of the second pockets 83B are opposite one another.

Figure 6:
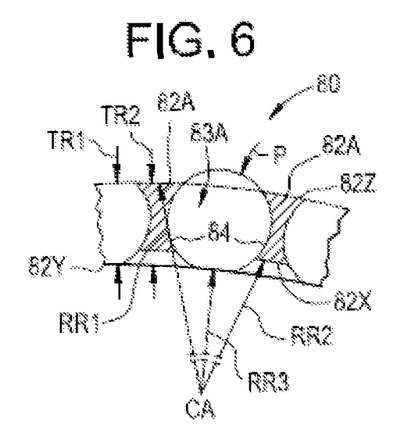
FIG. 6 is a top cross sectional view of a portion of the cage of FIG. 3 taken across line 6-6 and illustrating a cylindrical roller pocket.

Referring to FIG. 6, each of the pockets 83A and 83B are defined by a cylindrical surface 84 formed in opposing circumferential facing portions of the each of the rails 82A and 82B, respectively. The cylindrical surfaces 84 of the first pockets 83A are formed, for example, by plunge milling or drilling in an axial direction inwardly towards the first axially facing surface 81A. The cylindrical surfaces 84 of the second pockets 83B are formed, for example, by plunge milling or drilling in an axial direction inwardly towards the second axially facing surface 81B. In one embodiment, the cage 80 includes forty two first pockets 83A and forty two second pockets 83B. However, any number of pockets per side may be employed including but not limited to 45, 48 or 52 pockets per side (e.g., 45 first pockets 83A and 45 second pockets 83B, etc.). Each of the pockets 83A and 83B has a cylindrical pocket diameter P of about 1.5 to 2.5 percent greater than a major diameter DR (see FIG. 9B) of the rollers 115. In one embodiment, each of the first pockets 83A and each of the second pockets 83B has a cylindrical pocket diameter P of about 1.7 to 2.2 percent greater than a major diameter DR of the rollers 115.

As shown in FIG. 6, the cage 80 has a radial thickness TR1 at a central portion of the annular ring 81. Each of the first rails 82A has a radial thickness TR2 at an axially distal end of the first rail 82A. Each of the second rails 82B has a radial thickness TR2 at an axially distal end of the second rail 82B. The rollers 115 have a major diameter DM (see FIG. 9B) that is greater than the radial thickness TR of the first rail 82A and the second rail 82B so that the first radius R1 is greater than the second radius R2 and the third radius R3.

As shown in FIG. 6, the cage 81 has a central axis CA. The cage defines a first radius RR1 measured from the central axis CA to a radially outermost surface 82Z of the cage 81. In one embodiment, the radially outermost surface 82Z is cylindrical. The cage 81 defines a second radius RR2 measured from the central axis CA to a radially inwardmost surface 82X located at a juncture with the axially distal end of the first rail 82A. The cage 81 defines a third radius RR3 measured from the central axis CA to a radially innermost axial end 82Y of the first pocket 81A. The second rails 82B and second pockets 83B are configured in a similar manner. The first radius RR1 is greater than the second radius RR2 and the third radius RR3. The third radius RR3 is greater than the second radius RR2, thereby defining a taper between the radially innermost axial end 82Y of the first pocket 81A and the radially inwardmost surface 82X.

Figure 5:
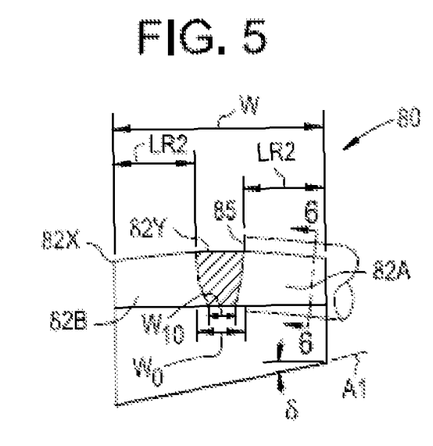
FIG. 5 is a cross sectional view of a portion of the cage of FIG. 3 taken across section B-B.

Referring to FIGS. 3 and 5, each of the first pockets 83A and each of the second pockets 83B have an axially outward facing convex spherical bottom surface 85. The spherical bottom surfaces have a radius of curvature $R_p$ as shown in FIG. 5.

As shown in FIG. 5, each of the first rails 82A and each of the second rails 82B extend a length LR2 (FIG. 9B) from the pocket bottom 85 such that the width W is two times the length LR2 plus the width Wo.

In one embodiment, the cage 80 is manufactured from a high leaded tin bronze per ASTM B505, UNS C93200.

The cage 80 is disposed between the inner race 110 and the outer race 112 with one roller of the plurality of rollers 115 rollingly engaged in each pocket. During operation of the bearing 100, the cage 80 causes the rollers to precess or index in response to small angular oscillatory movement between the inner race 110 and the outer race 112 thereby indexing the rollers through high load zones and into lower load zones within the bearing 100.

As shown in FIGS. 5 and 10, the cage defines a contact angle δ between the cage and a central axis A1 of the bearing 100. The length LR2 is greater than an axial width LR1 of the hourglass rollers 115 as shown in FIG. 9B.

Figure 9A:
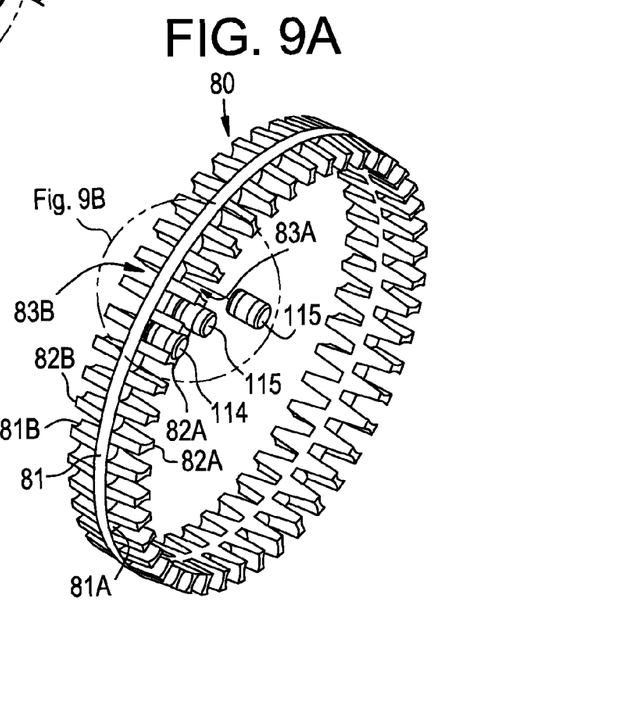
FIG. 9A is a perspective view of the cage of the present invention.
Figure 9B:
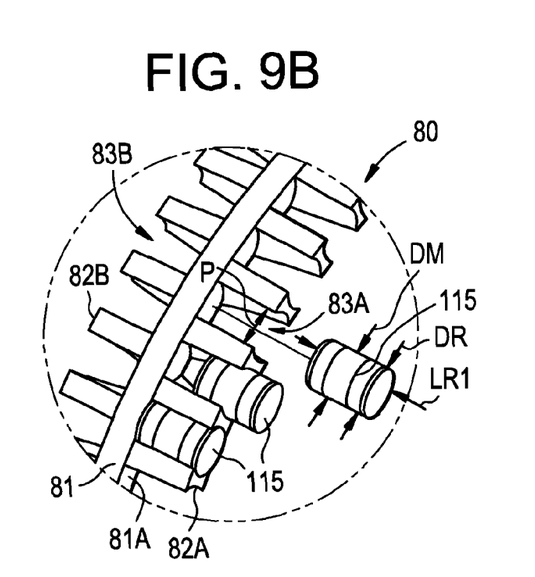
FIG. 9B is an enlarged view of the cage of FIG. 9A.

As shown in FIGS. 9A and 9B, each roller of the plurality of rollers 115 rollingly engages one of each pocket of the plurality of pockets 83A and 83B.

Figure 7:
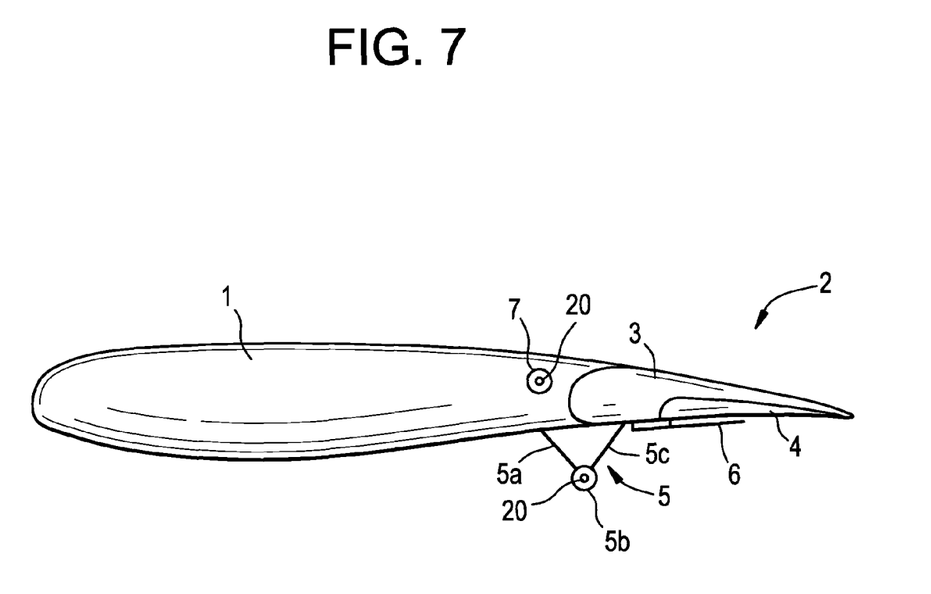
FIG. 7 illustrates schematically a cross section through an aircraft wing having a trailing edge flap arrangement in accordance with the invention shown in its retracted position.

Referring to FIG. 7, an aircraft wing includes a main fixed wing portion 1 and a single slotted trailing edge flap arrangement 2. The flap arrangement 2 includes a main element 3 and an auxiliary flap element 4 supported by the main flap element 3. The main flap element 3 is pivotally supported from the fixed wing portion 1 by a drop hinge linkage arrangement 5. The drop hinge linkage arrangement 5 includes a fixed strut 5a, a hinge point 5b and a drop link 5c. The fixed strut 5a is mounted to the fixed wing portion 1 and carries the hinge point 5b. The drop link 5c connects the main flap element 3 to the hinge point 5b. The auxiliary flap element 4 is supported by a rail 6 mounted to the main flap element 3. The auxiliary flap element 4 is slidably disposed upon the rail 5 for translational movement relative to the main flap element 3. The hinge point 5b has the bearing 20 (as described herein with reference to FIGS. 1-6) mounted therein. The bearing 20 includes the cage 80 as described herein.

FIG. 7 shows the flap arrangement 2 in its retracted position. The main flap element 3 is stowed, tucked against the trailing edge of the fixed wing portion 1. The auxiliary flap element 4 is stowed in a forward position so as to be nested beneath the rear of the main flap element 3. When stowed, the auxiliary flap element 4 completes the aerofoil profile of the main flap element 3. The trailing edges of the main and auxiliary flap elements 3 and 4 are substantially coincident when the auxiliary flap element is in its retracted, stowed position.

Movement of the main flap element 3 is effected by rotary actuator 7, which is connected by a linkage arrangement (not shown) to the main flap element 3. In one embodiment, the actuator 7 has one of the bearings 20 disposed therein. The bearing 20 includes the cage 80 disposed therein as described herein. While the actuator 7 is described as having one of the bearings 20 therein, the present invention is not limited in this regard as any number of the bearings 20 may be employed in the actuator 7.

Figure 8:
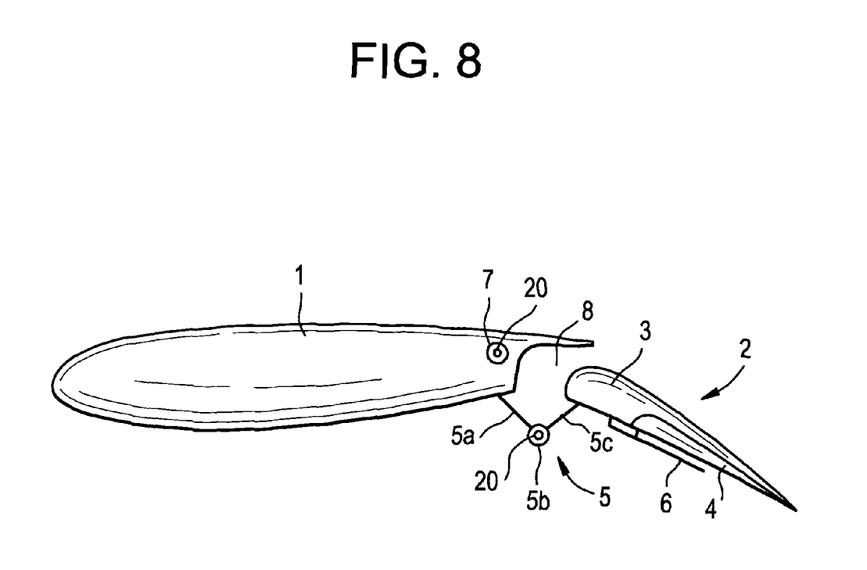
FIG. 8 illustrates the aircraft wing with the flap arrangement partially deployed.

FIG. 8 illustrates the flap arrangement 2 in its partially extended position. The main flap element 3 is deployed by rotating it downwardly using the drop hinge mechanism 5. As can be seen from FIG. 7, the auxiliary flap element 4 can remain in its stowed, fully forward position as the main flap element 3 is deployed. In this partially extended configuration, the flap arrangement 2 functions substantially identically to a standard drop hinge flap arrangement. With the main flap element 3 extended by rotation about the drop hinge mechanism 5, a slot 8 is opened up between the fixed wing portion 1 and the main flap element 3. The single slotted flap configuration shown in FIG. 7 enables high pressure air from the lower wing surface to pass through the slot 8 to energize the boundary layer over the upper surface of the main flap element 3 so as to postpone stall in a conventional manner.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A edge flap arrangement for an aircraft wing, the arrangement comprising:
    a main flap element and an actuator for moving the main flap element relative to the wing; and
    a linkage arrangement supporting the main flap element from the aircraft wing for movement relative to the wing, the linkage arrangement including a fixed strut secured to the aircraft wing and a drop link secured to the main flap, the fixed strut and the drop link being pivotally connected by a hinge point;
    the hinge point comprising at least a first bearing, the first bearing comprising:
    an outer race having at least one convex inner surface and an interior area;
    an inner race having a convex outer surface, a portion of the inner race being disposed in the interior area;
    a plurality of rollers disposed between the inner race and the outer race, each of the plurality of rollers having an hourglass shape and being in rolling engagement with the inner race and the outer race each of the rollers having an axial width; and
    a cage disposed between the inner raceway and the outer raceway, the cage comprising:
    an annular ring having a first axial face and a second axial face, a plurality of first rails extending a length from the first axial face and a plurality of second rails extending the length from the second axial face;
    a plurality of pockets, each of the plurality of pockets defined by opposing circumferentially facing walls of at least one of adjacent pairs of the first rails and adjacent pairs of the second rails;
    the circumferentially facing walls being concavely formed so that each of the plurality of pockets is cylindrical;
    one of the plurality of rollers is rollingly engaged in each of the plurality of pockets; and
    the length being of a magnitude greater than an axial width of an hourglass roller to be disposed in each of the plurality of pockets.

2. The edge flap arrangement of claim 1, further comprising spherical pocket bottoms.

3. The edge flap arrangement of claim 1, wherein the cage is manufactured from a bronze material.

4. The edge flap arrangement of claim 3, wherein the bronze material is a high leaded tin bronze per ASTM B505.

5. The edge flap arrangement of claim 1 wherein the edge flap is for a trailing edge of a wing of an aircraft.

6. The edge flap arrangement of claim 1 wherein the aircraft is an Airbus A-350 aircraft.

7. The edge flap arrangement of claim 1, further comprising at least one second hourglass bearing disposed in the actuator.

8. The edge flap arrangement of claim 1 wherein the hinge point comprises a plurality of first bearings.

9. The edge flap arrangement of claim 7 wherein the actuator comprises a plurality of second bearings.

* * * * *